United States Patent
Rountree

(10) Patent No.: US 7,791,463 B2
(45) Date of Patent: Sep. 7, 2010

(54) UNIVERSAL HELP LIGHT

(75) Inventor: Robert Louis Rountree, Philadelphia, PA (US)

(73) Assignee: Robert L. Rountree, Philadelphia, PA (US)

( * ) Notice: Subject to any disclaimer, the term of this patent is extended or adjusted under 35 U.S.C. 154(b) by 203 days.

(21) Appl. No.: 11/906,085

(22) Filed: Sep. 29, 2007

(65) Prior Publication Data

US 2009/0085735 A1    Apr. 2, 2009

(51) Int. Cl.
*B60Q 1/52* (2006.01)

(52) U.S. Cl. ...................... 340/471; 340/468

(58) Field of Classification Search ......... 340/468–479; 362/542, 545
See application file for complete search history.

(56) References Cited

U.S. PATENT DOCUMENTS

| | | | | |
|---|---|---|---|---|
| 3,800,430 A | * | 4/1974 | Samra | 340/468 |
| 3,947,815 A | * | 3/1976 | Muncheryan | 340/575 |
| 4,328,481 A | * | 5/1982 | Sexton | 340/331 |
| 4,631,516 A | * | 12/1986 | Clinker | 340/464 |
| 5,500,638 A | * | 3/1996 | George | 340/468 |

* cited by examiner

*Primary Examiner*—Jeffery Hofsass

(57) ABSTRACT

The Universal Help Light is a rectangular shaped light that is positioned or mounted along the rear windshield of an automobile.

When the light is connected to the vehicles flasher system, it flashes the word "H E L P" concurrently with the auto's hazard or emergency flashers.

The light flashes as described, to give clear notice that help is needed and is being summoned.

1 Claim, 1 Drawing Sheet

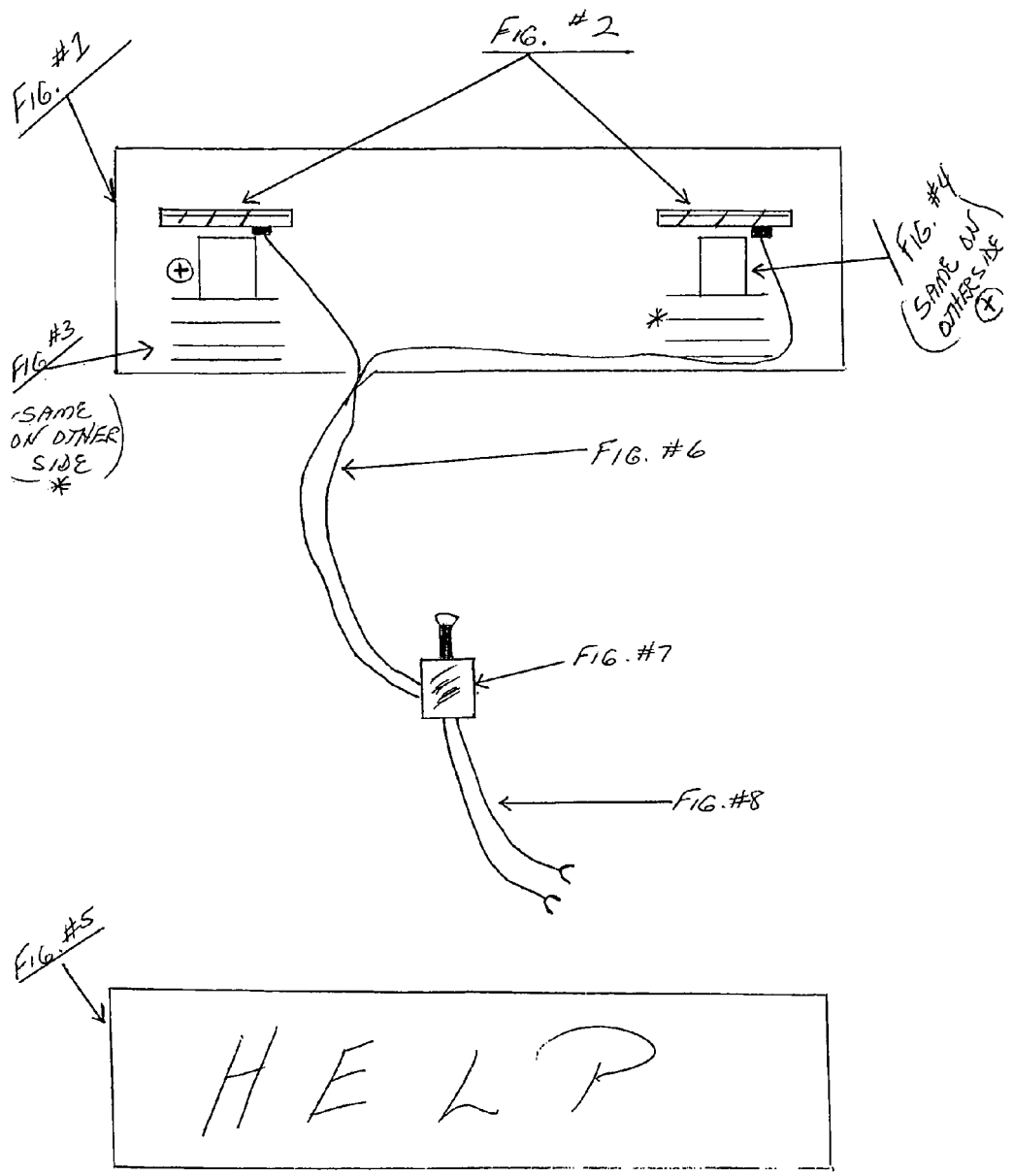

UNIVERSAL HELP LIGHT

THE BACKGROUND AND SUMMARY OF THE INVENTION

The Universal HelpLight is comprised of the following components, making up its specifications.

1.) An electrical box for housing the light; 6" in length, 3" in width and 2" depth.
2.) A cover allowing illumination there through; 1" in width and 3/16" in depth, each.
3.) The box contains two LED light panels.
4.) PVC coupler's used to position the panel close to the cover; 1¼" in height, 1" wide, 1/16 in thickness.
5.) A toggle switch used to illuminate the light by a constant flashing allowing those people close by to see the Help Light..
6.) 20' of (two strand) twenty (20) gauge electrical wire for conduction.

Each year millions of American motorist find themselves in need of some type of roadside assistance, from a disabled vehicle, to medical assistance, to something worst or unfortunate. The development of the GPS (GLOBAL POSITIONING SYSTEM) as well as onstar are phenomenal instrument of technology, as well as the cell phone. But in either case, not everyone has one, i.e. GPS, onstar, a working cell phone, a charged cell phone or a cell phone period, as incredible as it may sound.

The automobile hazard flasher is not recognized as a universal call for help. However there is still an economical, inexpensive means to alert for help, in those instances when your car/vehicle becomes distressed and in need of roadside assistance, or there is a need to alert for roadside assistance because of another type of an unfortunate instance.

The means and the answer is "The Universal Help Light". The "Universal Help Light" allows people/(sources of assistance) to immediately see the condition of the people in/with the vehicle, to immediately see the severity of the circumstances involved in the situation. And that is what GPS does not allow in the immediacy of an emergency.

With the "Universal Help Light" you become more than just an electronic manifestation, in your call for help. This is where the "Universal Help Light" is superior to GPS. It's amber face with thick bold black capital letters spelling out the word "HELP", consistently flashes with the hazard flashers to alert every noticing passersby that help is unquestionably needed, immediately The "Universal Help Light" comes with an independent disabling switch, allowing you the convenience to turn it off when not needed, such as to stop along a highway shoulder to make or receive a cell phone call.

Imagine when the need for help exist, and just about everyone walking, driving, riding a bike, motorcycle, or even a bus gives notice to someone in need of help and somehow engages a means to assist.

GPS is great . . .
Cellular phones are fine . . .
But the "Universal Help Light" is immediate, and so is the awareness that it provides. When help is summoned, the "Universal Help Light" instantly announces that help is needed at the location where the occurrence can be physically seen on site, not just electronically detected. With the "Universal Help Light" the call for immediate assistance is always within reach.

The majority of the times, when emergency help is needed, immediate attention can make the difference between a good or questionable outcome.

The "Universal Help Light" is a must have piece of emergency equipment, no less needed than your traveling First Aid Kit. So buy the "Universal Help Light" and add an extra measure of security to your life. The return on your investment could be priceless.

Remember nothing is quicker than "The speed of light."

DESCRIPTION OF THE FIGURES AND VIEWS OF THE DRAWING

As shown in FIG. 1
A Black (in color) electrical box used as a circuitry compartment.
This item houses all of the components of the product.
It's dimensions are 6" in length, 3" in width and 2" in depth.
This items contains all of the following elements comprising the "UNIVERSAL HELP LIGHT"

As shown in FIG. 2
These items are used to illuminate the light once connected to a vehicle's light source.
They are two LED light panels each panel housing eight circular lights, and measuring 1½" in length 1" in width and 3/16" in depth, each.

As shown in FIG. 3
These items are eight metal washers used as foundations, coupled together to make two stacks of four each. Both stacks are bound and anchored with silicon adhesive, and attached to the base of the electrical box.
These two stacks help elevate the LED light panels closer to the lens cover for greater light projection. Each washer is ¾" in width and ⅛" in height.

As shown in FIG. 4
These items are two PVC plastic pipe couplers, measuring 1¼" in height, 1" wide, 1/16" in thickness, with a hollow center. These items are used to extend the height of the light panels. Each one being placed on top of each stack of washers, to finalize the height of the light panels beneath the lens.

As shown in FIG. 5
This item is the plexi-glass cover of the light. This item sits atop the electrical box (as referenced in FIG. one) and is the lens of the light. It is painted yellow on its top surface, with the word HELP stenciled in black on top of the yellow paint and measuring 6" in length, 3"wide and ⅛" in height.

As shown in FIG. 6
This item is for the conduction of current from the vehicle's lighting source to the "UNIVERSAL HELP LIGHT". This figure represents 20' of (two strand) twenty (20) gauge electrical wire, attached to the LED light panels, and for connection to a ON/OFF toggle switch at the opposite end. (Note description below in FIG. 7).

As shown in FIG. 7
This item is an on/off toggle switch that is connected to the UNIVERSAL HELP LIGHT and used to send power to it when the UNIVERSAL HELP LIGHT is connected to the vehicle's lighting source when the toggle switch is in the ON position.

As shown in FIG. 8
This item represents 12' (two strand) twenty (20) gauge electrical wire, one for positive electrical feed and one for grounding, with horseshoe connector attachments at both ends. The horseshoe connector ends attach to the toggle switch at one end and the vehicle's lighting source at the other.

End of description of figures and side angle view of drawing.

The invention claimed is:
1. A Universal Help Light comprising:
An electrical box for housing the light; a cover allowing illumination there through;
Wherein the box contains two LED light panels each coupled upon a PVC coupler used to position the panel close to the cover;
The cover being yellow on its top surface with the word HELP stenciled in black on its surface; and
A toggle switch is used to illuminate the light by a constant flashing allowing those people close by to see the Help Light.

* * * * *